Patented Sept. 11, 1945

2,384,611

UNITED STATES PATENT OFFICE 2,384,611

RIGID FOAM

Orin R. Douthett, Brooklyn, N. Y., assignor to Barber Asphalt Corporation, Barber, N. J., a corporation of New Jersey No Drawing. Application July 15, 1942, Serial No. 451,089

13 Claims. (Cl. 260—28)

This invention relates to a material in rigid cellular or porous form and of light weight adapted for use as an insulating material in buildings.

Generally speaking, the material, according to this invention, will comprise a dried or set foam including essentially polyvinyl alcohol with which is included bitumen and/or a hardening agent, with or without the inclusion of other ingredients, as fibre, etc.

In preparing the material according to this invention, broadly, polyvinyl alcohol in aqueous solution will be whipped or beaten to a foam by any suitable means. The foam will contain bitumen and/or a hardening agent which may be present in the solution before the foam is formed or added to the foam. Finally the foam will be poured into a mould and allowed to dry.

More specifically, to the foam formed by whipping or beating an aqueous solution of a polyvinyl alcohol, there will be added bitumen in powdered form, in which case it will act as a hardening agent as well as constituting the bitumen ingredient, or, alternatively the bitumen may be present in an emulsified form in the polyvinyl alcohol solution before it is whipped or beaten to a foam, in which case a hardening agent will be included in the foam.

It will be understood that by the term "bitumen" generally speaking, is intended any solid or semi-solid, thermoplastic, cementitious, hydrocarbon material or a mixture of such materials, of natural or pyrogenous origin and frequently containing associated impurities.

Again, whether or not bitumen is included in powdered form, in which form it acts as a hardening agent, a hardening agent may be present in the polyvinyl alcohol solution before it is whipped or beaten to a foam or, alternatively, a hardening agent may be admixed with the foam after it is formed. Where a hardening agent is included, it may be present in part in the polyvinyl alcohol solution before it is whipped or beaten to a foam and, in part, added to the foam after its formation. This latter procedure will be generally followed where the hardening agent includes setting and non-setting agents, the non-setting agent being added to the solution and the setting agent being added to the foam.

The hardening agent, it will be understood, may comprise a hydraulic setting material, such as gypsum plaster, Portland cement, natural cement, oxy-chloride cement, or a non-setting material such as slate flour, fine sand, silica dust, ground talc. The hardening agent may comprise mixtures of setting materials, mixtures of non-setting materials, or mixtures of setting and non-setting materials; and as above indicated a non-setting material may be added before the foam is formed by beating and a setting material subsequently added to the foam.

Where other ingredients are included, as for example, fibre, such may be included in the polyvinyl alcohol solution before whipping or beating, or admixed with the foam after its formation.

For the preparation of material according to this invention, any suitable polyvinyl alcohol may be used. Preferably, the polyvinyl alcohol will be a high or medium viscosity polyvinyl alcohol of the type which is readily soluble in cold water, known in the art as grade A, or a high or medium viscosity polyvinyl alcohol of the type which is only sparingly soluble in cold water, known in the art as grade B. Desirably, a mixture of a viscous or medium viscous grade A and a viscous grade B, for example, in the proportion of one part grade A to six parts grade B, will be used.

The polyvinyl alcohol may, by way of example, be used in amount, for example, within about the range 0.6% to 15.0% by weight on the basis of the dried foam. In practice, the minimum amount of polyvinyl alcohol will be dictated by the type of foam desired and the inclusion or non-inclusion of other ingredients, as bitumen, hardening agent, etc., and the maximum will, in general, be dictated by cost.

Where bitumen is included, any suitable bitumen as asphalt, preferably a hard asphalt, may be used. By way of example, 1–10 penetration (A. S. T. M.) pulverized pressure still pitch or powdered Gilsonite will be found satisfactory. Where bitumen is added in finely divided solid state, it may be present in amount, for example, within about range 17.0%–50.0% by weight on the basis of the dried foam and may be added in whole or in part to the polyvinyl alcohol solution before whipping or beating or in whole or in part to the foam after its formation.

Where the bitumen added is present in emulsified form in the polyvinyl alcohol solution before whipping or beating, any suitable bitumen, as asphalt, may be used. By way of example, 10–50 penetration (A. S. T. M.) Trinidad residuum, 10 penetration (A. S. T. M.) pressure still pitch, or the like may be used and the bitumen may be in amount of, for example, 10–70% bitumen and 90–30% of water.

Where the bitumen is used in the form of an emulsion, the emulsification of the bitumen may be effected through the medium of any suitable emulsifying agent of a type which will not be detrimentally reactive with the polyvinyl alcohol, such as bentonite, gelatin, or the like, or with the hardening agent. However, preferably, the bitumen will be emulsified through the use of a polyvinyl alcohol, additional polyvinyl alcohol being added to the emulsion if necessary to effect production of the foam.

Where emulsions of hard asphalts such as exemplified above, are used, such may be produced in any manner well known to the art; for example, by emulsifying a solution of the bitumen.

Where further ingredients as fibre are included, the fibre may, for example, be glass wool, slag wool, rock wool, bagasse fibre, or the like.

In proceeding for the production of material according to this invention, from the broad standpoint, a dilute solution of polyvinyl alcohol in water will be whipped or beaten to a foam, for example, with the use of a whip, and the foam containing a hardening agent poured into a mould and permitted to dry.

The hardening agent included in the material, may be added in finely divided state to the foam produced as described above by admixing the hardening agent with the foam after its production as described above. Alternatively, and more particularly in the case of non-setting hardening agents such as slate flour, fine sand, ground talc and the like, the hardening agent may be admixed with the polyvinyl alcohol solution before whipping or beating the solution to a foam; and as will be understood, portions of the hardening agent may be added to the solution before foaming and the balance admixed with the foam after its formation, and more especially where both a non-setting and a setting material comprise the hardening agent.

Where a bitumen in finely divided solid form is to be included, such may be mixed with the foam after its formation as described above or admixed with the polyvinyl alcohol solution before foaming and, as will be understood, part of the bitumen may be admixed with the polyvinyl alcohol solution, for example, in emulsified form, before foaming and the balance, for example in finely divided form, admixed with the foam after its formation.

Where a bitumen is included in the form of a bituminous emulsion, such, formed in any suitable manner, preferably with use of a polyvinyl alcohol as the emulsifying agent in sufficient quantity to effect foaming, will be whipped or beaten to a foam.

Where some additional ingredient as fibre is added, it may be added to the polyvinyl alcohol solution before foaming or admixed with the foam after its formation, the hardening agent may be added before foaming or to the foam.

In cases where both a bitumen and a hardening agent are used, it will, from the above discussion we believe, be obvious that where the bitumen is in finely divided solid form, it may be admixed with the hardening agent for addition to the polyvinyl alcohol solution before foaming, or for admixture with the foam after its formation. Generally speaking, where a bitumen is added in the form of a bituminous emulison and a hardening agent is also added, the hardening agent will desirably be added to the foam after its formation in order to avoid breaking the emulsion, especially in cases where the hardening agent would break the emulsion.

In addition to the above ingredients, the material, in accordance with this invention, may contain various ingredients to promote stability of the foam as egg albumen, casein, and the like and, as where a bitumen is included, ingredients such as magnesium carbonate, chlorinated naphthalene, diammonium hydrogen phosphate, or the like, tending to reduce the combustibility of the product may be included.

The product in accordance with this invention, will be of light weight and, generally speaking, will comprise a dried foam containing a multiplicity of voids defined by walls and, more specifically, may be a light weight, rigid material containing a multiplicity of adjacent voids defined by thin walls. Variously, the product will be cellular, i. e., the thin walls will be continuous, or it will be of porous form, i. e., the walls will variously be broken or ruptured. The particular form, that is, porous or cellular, will depend upon the proportions of the ingredients.

As illustrative of material in accordance with this invention and of procedure for its production, for example, a satisfactory material according to this invention may be made up on the following formula:

| | Per cent |
|---|---|
| Polyvinyl alcohol, high viscosity type B | 1.43 |
| Water | 70.00 |
| Electrically precipitated green slate flour | 28.57 |

In the above formula the percentages of ingredients are based on the weight of the finished foam before drying.

In preparing the product on the above formula the polyvinyl alcohol is dissolved in the water and whipped or beaten, in any convenient fashion, to a stable foam and the slate flour is then added gradually to the foam with continued beating. After the addition of the slate flour the beating is continued for a period of time, say about five minutes, and the foam then poured into a mould and dried.

As further illustrative of product in accordance with this invention and procedure for its preparation, a satisfactory product may be made up on the following formula:

| | Per cent |
|---|---|
| Polyvinyl alcohol, high viscosity type B | 0.96 |
| Polyvinyl alcohol, high viscosity type A | 0.24 |
| Water | 36.95 |
| Pulverized pressure still pitch | 40.16 |
| Quick set guaging plaster | 17.67 |
| Glass wool fibre | 4.02 |

In the above formula the percentages of the various ingredients are on the basis of the weight of the finished foam before drying.

In preparing the product on the above formula, the polyvinyl alcohols are dissolved in the water. The dry ingredients are then mixed with the water containing the polyvinyl alcohols in solution and the mixture then beaten, in any convenient way, to a stable foam and then poured in a mould and dried.

As further illustrative of satisfactory product in accordance with this invention and the procedure for its preparation, a satisfactory product may be made, for example, on the following formula:

| | Per cent |
|---|---|
| Polyvinyl alcohol, high viscosity type A | 0.25 |
| Polyvinyl alcohol, high viscosity type B | 1.00 |
| Water | 36.41 |
| Asphalt emulsion | 39.75 |
| Slow set guaging plaster | 18.41 |
| Glass wool fibre | 4.18 |

In the above formula the percentages of the several ingredients are by weight based on the weight of the finished foam before drying.

The asphalt emulsion included in the above formula may comprise 56.48% by weight of a 10 penetration (A. S. T. M.) residual asphalt from Trinidad crude oil, 0.5% high viscosity type A polyvinyl alcohol, 0.04% sodium hydroxide, 2.97% naptha, 40.01% water.

In preparing the product according to the above formula the polyvinyl alcohols will be dissolved in the water, then the asphalt emulsion will be added with stirring and finally the dry ingredients will be added with stirring. The mixture will then be beaten or whipped, in any convenient manner, to a stable foam which will require about 45 minutes, the foam poured into a mould and dried.

It will be understood that this invention contemplates, broadly, a material comprising a dried foam, including polyvinyl alcohol, and a hardening agent, more specifically with the inclusion of a bitumen which may also comprise the hardening agent, and if desired other ingredient, as fibre. Therefore, it will be appreciated that the above general discussion and specific examples are intended to be illustrative and not limiting.

What I claim and desire to protect by Letters Patent is:

1. A light weight rigid material comprising a dried foam containing a multiplicity of voids defined by walls including polyvinyl alcohol.

2. A light weight rigid material comprising a dried foam containing a multiplicity of voids defined by walls including polyvinyl alcohol and a hardening agent.

3. A light weight rigid material comprising a dried foam containing a multiplicity of voids defined by walls including polyvinyl alcohol and bitumen.

4. A light weight rigid material comprising a dried foam containing a multiplicity of voids defined by walls including polyvinyl alcohol, bitumen and a hardening agent.

5. A light weight rigid material comprising a dried foam containing a multiplicity of voids defined by walls including polyvinyl alcohol and a finely divided inert material.

6. A light weight rigid material comprising a dried foam containing a multiplicity of voids defined by walls including polyvinyl alcohol and a set hydraulic cement.

7. A light weight rigid material comprising a dried foam containing a multiplicity of voids defined by walls including polyvinyl alcohol, bitumen, and a finely divided inert material.

8. A light weight rigid material comprising a dried foam containing a multiplicity of voids defined by walls including polyvinyl alcohol, bitumen and a set hydraulic cement.

9. A light weight rigid material comprising a dried foam containing a multiplicity of voids defined by walls including polyvinyl alcohol and asphalt.

10. A light weight rigid material comprising a dried foam containing a multiplicity of voids defined by walls including polyvinyl alcohol, asphalt and a hardening agent.

11. A plastic mass capable of being hardened into a light weight material containing a multiplicity of voids defined by walls comprising a mechanical mixture of a stable foam including water and polyvinyl alcohol, and a hardening agent.

12. A plastic mass capable of being hardened into a light weight material containing a multiplicity of voids defined by walls comprising a mechanical mixture of a stable foam including water and polyvinyl alcohol, and a bitumen.

13. A plastic mass capable of being hardened into a light weight material containing a multiplicity of voids defined by walls comprising a mechanical mixture of a stable foam including water and polyvinyl alcohol, a bitumen and a hardening agent.

ORIN R. DOUTHETT.